I. G. FOSLER.
PULSATOR.
APPLICATION FILED DEC. 8, 1919.
1,376,804.
Patented May 3, 1921.
3 SHEETS—SHEET 1.
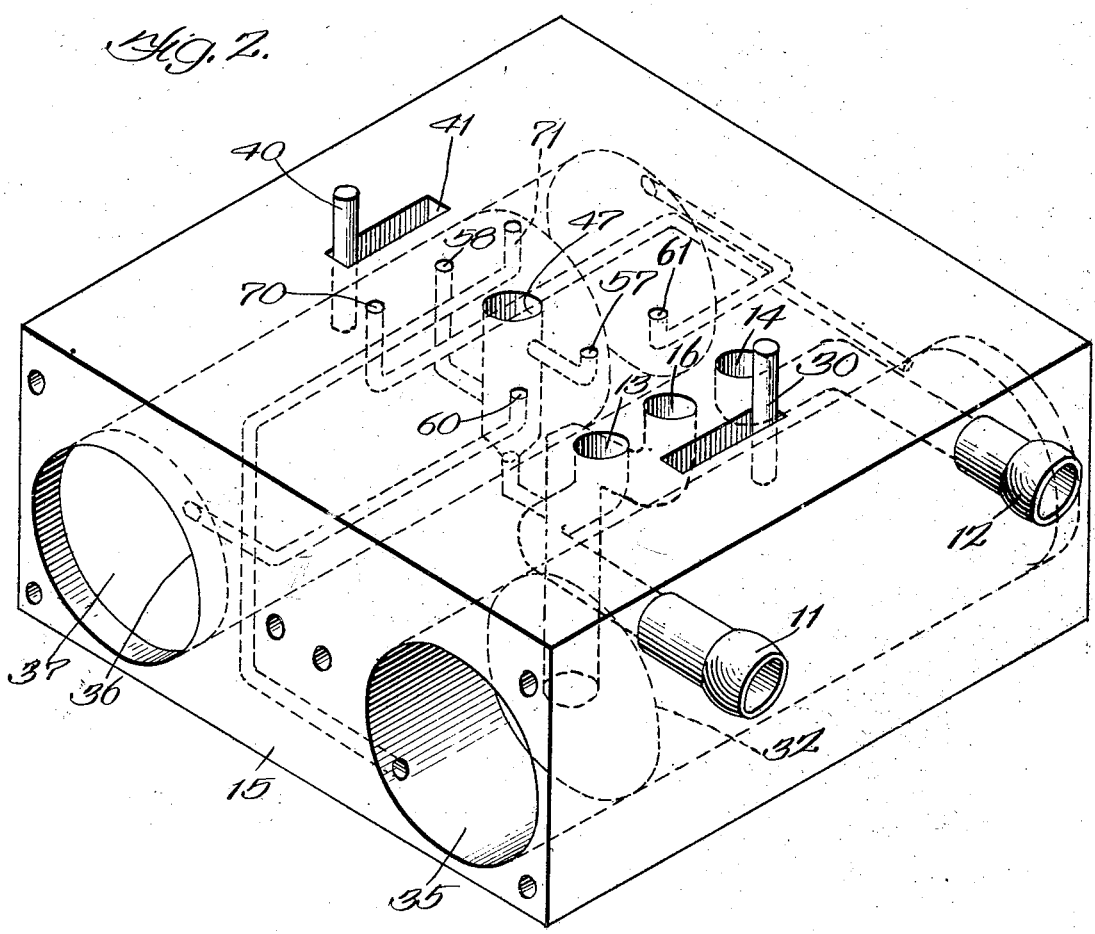
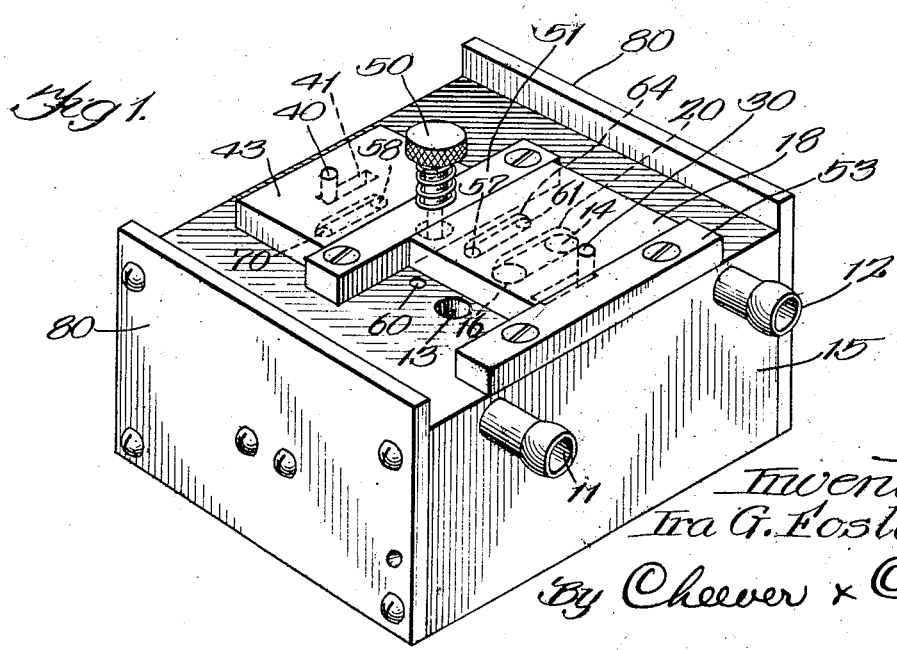
Inventor:
Ira G. Fosler
By Cheever & Cox
Attys.

I. G. FOSLER.
PULSATOR.
APPLICATION FILED DEC. 8, 1919.
1,376,804.
Patented May 3, 1921.
3 SHEETS—SHEET 2.
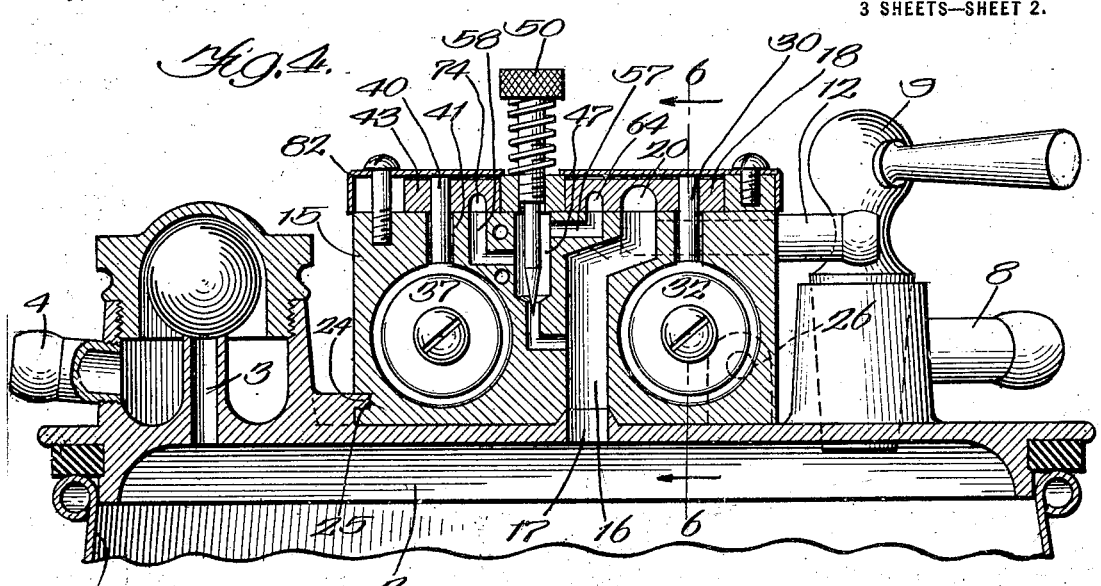
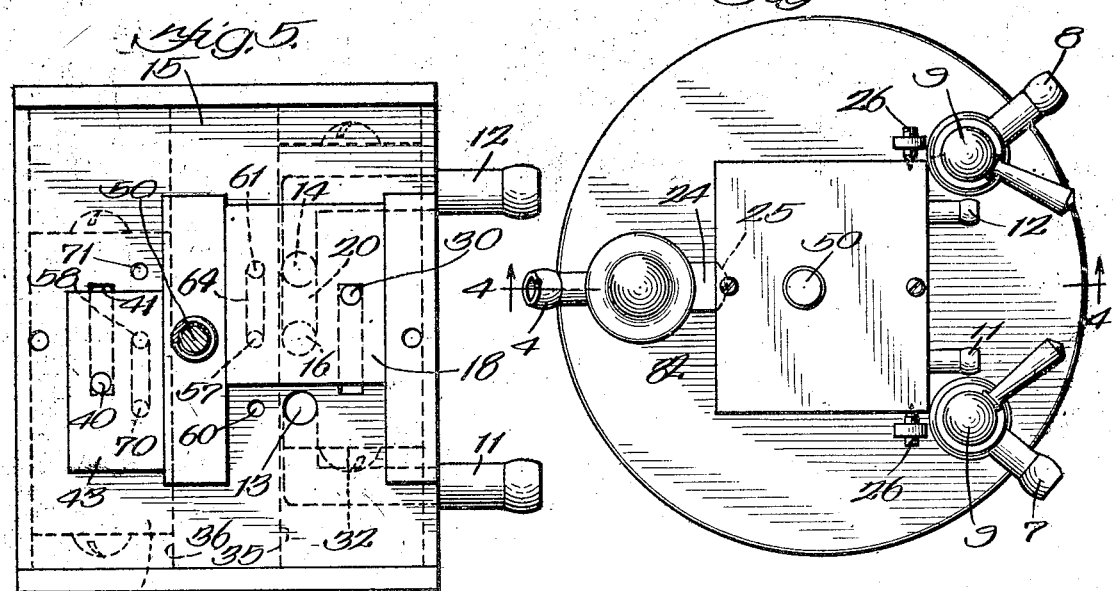
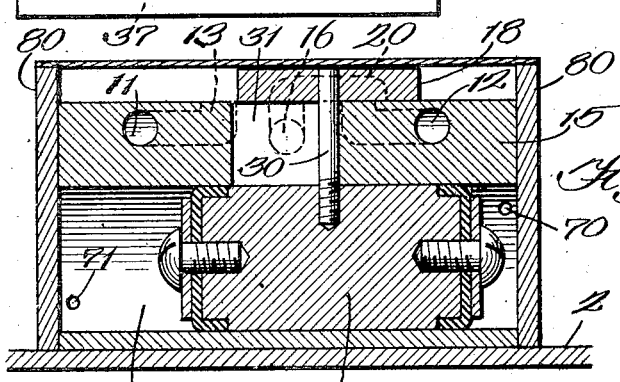
Inventor:
Ira G. Fosler
By Cheever & Cox
Attys I. G. FOSLER.
PULSATOR.
APPLICATION FILED DEC. 8, 1919.
1,376,804.
Patented May 3, 1921.
3 SHEETS—SHEET 3.
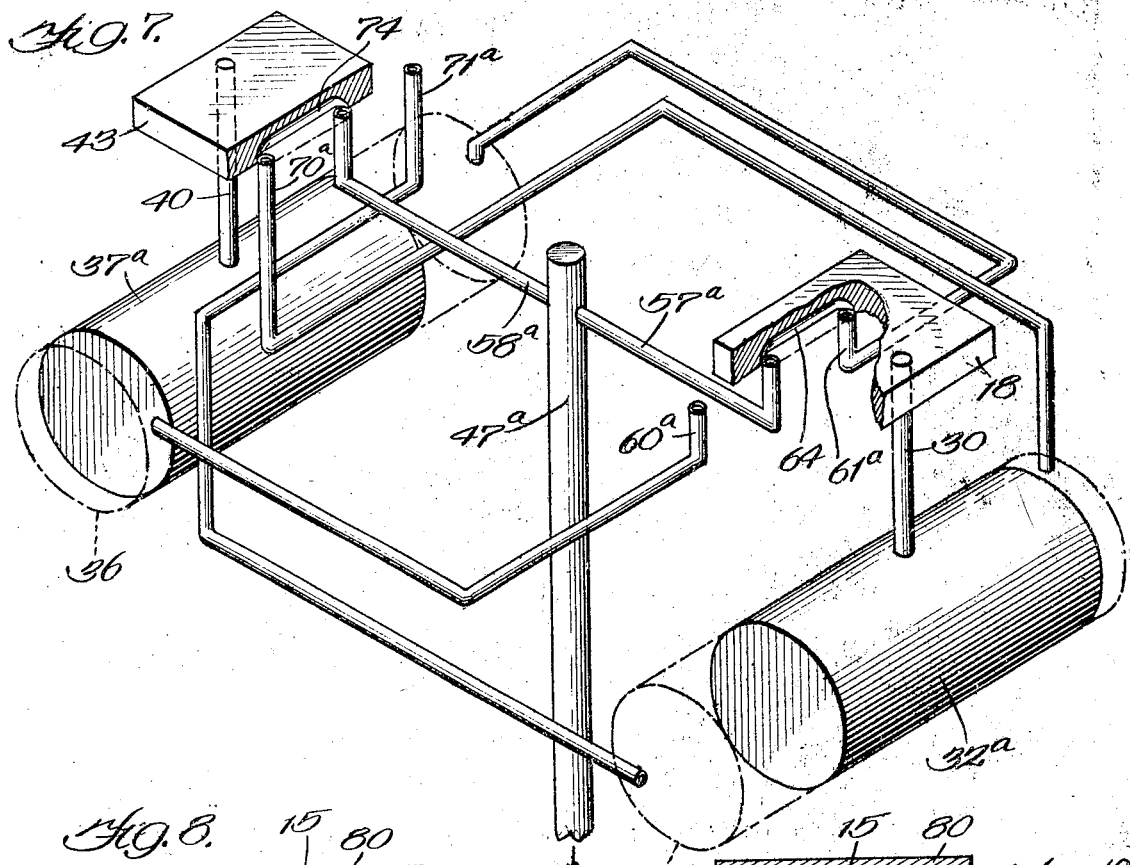
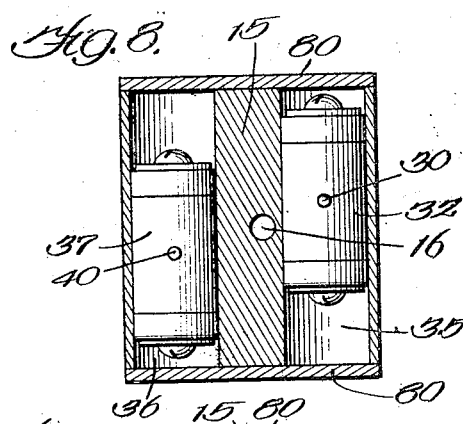
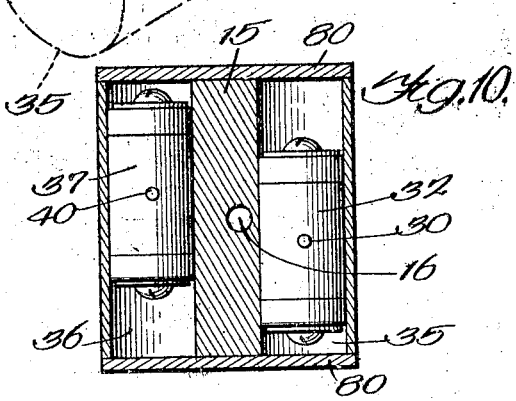
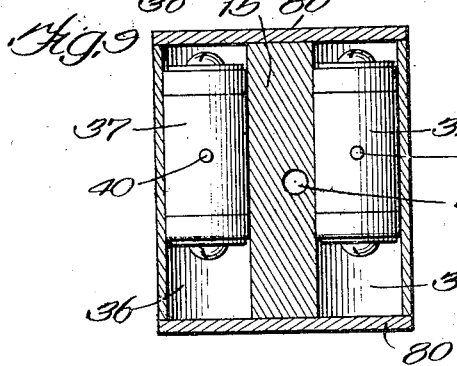
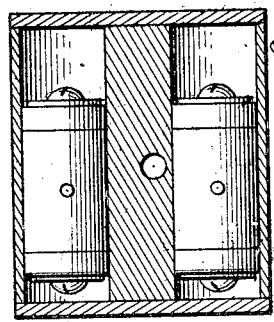
Inventor:
Ira G. Fosler
By Cheever & Cox
Attys

UNITED STATES PATENT OFFICE.

IRA G. FOSLER, OF CHICAGO, ILLINOIS.

PULSATOR.

1,376,804.            Specification of Letters Patent.        Patented May 3, 1921.

Application filed December 3, 1919. Serial No. 343,249.

*To all whom it may concern:*

Be it known that I, IRA G. FOSLER, a citizen of the United States, residing at Chicago, in the county of Cook and State of Illinois, have invented a certain new and useful Improvement in Pulsators, of which the following is a specification.

My invention relates to power devices, more particularly for actuating the pulsator valves of pulsators for milking machines. The object of the invention is to provide a simple, durable, and sure acting mechanism. Another object is to provide a device in which the parts may properly be made of relatively large size and simple configuration.

I have illustrated the invention as applied to the pulsator of a milking machine, and in the accompanying drawings, Figure 1 is a perspective view of the pulsator as a whole.

Fig. 2 is a perspective view of the block which forms the main body of the device.

Fig. 3 is a top plan view of the pulsator as applied to a milk pail cover.

Fig. 4 is a sectional view on the line 4—4, Fig. 3.

Fig. 5 is a top plan view of the parts shown in Fig. 1.

Fig. 6 is a vertical sectional view on the line 6—6, Fig. 4.

Fig. 7 is a diagrammatic view of the principal reciprocating parts and the passages which convey the motive fluid. In this view the passages are shown in the form of individual pipes, whereas in the commercial device, at least in the illustrated form, these passages are simply ducts drilled, cast or otherwise formed in the block itself.

Figs. 8, 9, 10, and 11 show successive positions of the two pistons within their respective cylinders.

Like numerals denote like parts throughout the several views.

In the particular embodiment selected to illustrate the invention, there is a milk pail 1 provided with a cover 2. The pail is kept under partial vacuum by having air drawn out through a port 3 which communicates with the suction pipe 4. It is common modern practice for the teat cups to be subjected to both continuous vacuum and pulsatory vacuum. In the present case, I have shown two nipples 7 and 8, one intended to be connected to one set of teat cups and the other to another set to subject them to continuous vacuum. These nipples communicate with the inside of the milk pail and the flow through them is controlled by valves 9 in the usual manner. The pulsatory air is communicated to the teat cups by way of nipples 11, 12, which communicate with passages 13, 14 formed in the block 15 which constitutes the main body of the pulsator. This block is mounted on the top of the milk pail cover and has a central, vertical passage 16 adapted to communicate with the aperture 17 in the top of the milk pail cover. The passages 13, 14 and 16 terminate in the upper surface of the block, which surface forms a seat for the valve 18. This valve has a passage 20 formed in its under surface and the construction is such that when the valve is in one extreme position, it will uncover the passage 13 and open it to the atmosphere and at the same time connect the passage 16 with the passage 14 thus putting the nipple 12 in communication with the inside of the milk pail, which is under vacuum. When the valve is in the other extreme position, it will uncover the passage 14 and open it to the atmosphere and at the same time connect the passage 16 with the passage 13. Thus the valve constitutes a controlling or reversing valve and as the passage 20 is internal, the atmospheric pressure will hold the valve close to its seat.

The block may be secured to the cover in various ways, but in the present case, is held chiefly by a tongue 24 which is an integral part of the cover and projects into a slot 25 in the block as best shown in Figs. 3 and 4. This fastening device is supplemented by two set screws 26 which engage the block from opposite sides, see Fig. 3.

The said valve 18, which alternately produces suction and atmospheric pressure in the nipples 11, 12 is reciprocated by a pin 30 which extends down through a slot 31 in block 15 and is screwed into or otherwise fastened to a piston 32 as shown, for example, in Fig. 6. The piston reciprocates in a cylindrical chamber 35 formed in block 15. One of the chief points of novelty of the invention resides in the means, direct and indirect by which the valve is actuated. These means will now be described:

The block 15 has two cylindrical chambers, the one 35, just mentioned and a similar one 36 located alongside of and parallel to it.

Within the chamber 36 is a piston 37 similar to the piston 32. A pin 40 projects upward from piston 37 as pin 30 does from piston 32. It works in a slot 41 formed in the block 15 and at its upper end engages a valve 43. This valve slides upon the upper surface of block 15 as does valve 18, previously described: but valve 18 performs a dual function,—that of causing the pulsations in the nipples 11, 12 and that of controlling the piston in the opposite cylinder 36. It may thus be considered a combined pulsator and controlling valve. The valve 43, recently mentioned, constitutes merely a controlling valve for controlling the piston in the cylinder 35 which is opposite to it. The passages which convey the motive fluid to and from the ends of the cylinders 35, 36 are preferably formed in the block by drilling or otherwise but they may, of course, assume the form of physical pipes as illustrated in the diagrammatic Fig. 7. Excluding, for the present consideration of Fig. 7, a valve chamber 47 is located about the middle of block 15 and communicates at its lower end with passage 16. This passage is controlled by a needle valve 50 which screws into a block 51 fastened to the top of the block 15. Incidentally, this block 51 forms also a guide for the valves 18 and 43 and a similar block 53 forms a like function for valve 18. Leading upward from chamber 47 are two passages 57, 58 which terminate in the upper surface of block 15. They lead in opposite directions, one toward cylinder 35 where its upper end or port can be controlled by the valve 18, and the other toward the cylinder 36 where its upper end or port can be controlled by the valve 43. In line with the port of passage 57 are the ports of two other passages 60, 61, one leading to one end of the cylinder 36 and the other to the other end of it. These are in line to be controlled by a passage 64 formed in the under side of the valve 18. The ports are so constructed that when the valve is in one extreme position, it will uncover the port 60 and open it to the atmosphere and at the same time the passage 64 will connect the port 61 to the port 57. This will cause the piston in cylinder 36 to travel and actuate the valve 43. When the valve 18 is in the opposite extreme position, it will uncover the port 61 and connect the port 57 with the port 60 and cause the piston in cylinder 36 to travel in the opposite direction and reverse the position of valve 43. In line with the port of passage 58 are the ports of two other passages 70 and 71, one leading to one end of the cylinder 35 and the other to the other end. These are in line to be controlled by a passage 74 formed in the underside of the valve 43. The parts are so constructed that when this valve is in one extreme position, it will uncover the port 70 and open it to the atmosphere and at the same time the passage 74 will connect the port 61 with the port 58. This will cause the piston in cylinder 35 to travel and actuate the valve 18. When the position of the valve 43 is reversed, it will uncover the port 71 and connect the port 71 with the port 58, thus causing the piston in cylinder 35 to travel in the opposite direction and reverse the position of valve 18. Hence, it will be seen that each of the valves 18, 43 controls the movements of the piston to which it is not mechanically connected. In other words, if we consider a valve as belonging to the piston which mechanically actuates it, it may be said that each valve controls the ports of the opposite cylinder and thereby causes the travel of the piston and valve which control the ports of its own cylinder.

In operation, the cycle will progress as illustrated in Figs. 8, 9, 10, and 11 successively. First, the piston 32 is at one end and the piston 37 at the opposite end of their travel, as shown in Fig. 8. Then piston 37 travels to the far end of its cylinder and comes opposite the piston 32 as shown in Fig. 9. The piston 32 then travels to the position shown in Fig. 10, after which the piston 37 travels back to its original position and the parts are in the position shown in Fig. 11. The movement of one piston reverses the controlling valve for the other piston and vice versa, and hence the successive movements are repeated in the manner described. While the flow in the various passages may be traced by the dotted lines in Fig. 2, the position of the passages is most easily understood from the diagrammatic view, Fig. 7, in which the pipe 47$^a$ is analogous to chamber 47 which is under constant suction. The pipes 57$^a$ and 58$^a$ are analogous respectively to the passages 57 and 58. The pistons 32$^a$ and 37$^a$ are analogous to the pistons 32 and 37 respectively; and the pipes 70$^a$ and 71$^a$ are analogous to the pipes 70 and 71 respectively. Pipes 60$^a$ and 61$^a$ are analogous to the passages 60 and 61 respectively. It will be manifest that each piston as it reaches the end of its stroke moves the valve mechanically connected to it in such manner as to cause the piston in the opposite cylinder to reverse its position and thereby reverse the position of the valve mechanically connected to it. This, in turn, causes a reversal of the first piston and so on.

From the foregoing, it will be seen that the parts of the pulsator itself are comparatively few in number and of simple design. While the cylinders may be made entirely separate, they are well adapted to be formed in a single block as illustrated, the ends being closed by simple plates 80, screwed or otherwise fastened in place. In order to protect the passages from dirt and damage, it is desirable to provide an easily removable cover 82. This may be either screwed in place or hinged to the block 15, as may be preferred.

It will also be noted that the plates 80 by being easily removable make it possible to slip the pistons out of the cylinders with little trouble so that the cup leathers at the ends of the cylinders can be renewed. In dealing with air tension as in the present case, it is important that the parts be close fitting in order to avoid leakage, and the illustrated construction affords simple and ready means by which the pistons and air packing may be kept in order.

Having thus described my invention what I claim as new and desire to secure by Letters Patent, is:—

1. A vacuum operated pulsator for milking machines having two cylinders each provided with a single piston adapted to travel substantially from one end of the cylinder to the other, the cylinders having flat external valve seats and ports opening through said seats, and flat valves slidable on said seats and having internal passages adapted to coöperate with the ports for exhausting air first from one port and then from another and simultaneously uncovering one of them to the atmosphere for causing the pistons to reciprocate, said valves lying on the outside of the cylinders whereby they are held to their seats by suction.

2. A vacuum operated pulsator for milking machines having two cylinders each provided with a single piston, the cylinders having flat, external valve seats exposed to atmospheric pressure and provided with three ports opening through them, and two flat valves, independent of each other, adapted to reciprocate on the exposed surface of the valve seats, said valves having internal passages adapted to coöperate with the ports and connect two of them at a time and simultaneously uncover one of them, each valve being mechanically connected to the piston in the opposite cylinder for being operated by it.

3. A vacuum operated pulsator for milking machines having two cylinders each with a removable plate at one end, each cylinder having a piston therein provided with packing, the cylinders having flat external valve seats with three ports opening through them, and flat valves slidable on said seats and having internal passages adapted to coöperate with the ports for causing the pistons to travel, each valve being independent of the other and being mechanically connected to the piston in the opposite cylinder.

4. A vacuum operated pulsator for milking machines having two cylinders each provided with a single piston adapted to travel substantially from one end of the cylinder to the other, the cylinders having flat external valve seats and ports opening through said seats, flat valves slidable on said seats and having internal passages adapted to coöperate with the ports for exhausing air first from one port and then from another and simultaneously uncovering one of them to the atmosphere for causing the pistons to reciprocate, said valves lying on the outside of the cylinders whereby they are held to their seats by suction, the valves being mechanically connected to the pistons for being operated by them, and air-controlling means operated by one of said valves.

5. A vacuum operated pulsator for milking machines having two cylinders each provided with a single piston, the cylinders having flat, external valve seats exposed to atmospheric pressure and provided with three ports opening through them, two flat valves, independent of each other, adapted to reciprocate on the exposed surface of the valve seats, said valves having internal passages adapted to coöperate with the ports and connect two of them at a time and simultaneously uncover one of them, each valve being mechanically connected to the piston in the opposite cylinder for being operated by it, and air-controlling means operated by one of said valves.

6. A vacuum operated pulsator for milking machines having two cylinders each with a removable plate at one end, each cylinder having a piston therein provided with packing, the cylinders having flat external valve seats with three ports opening through them, flat valves slidable on said seats and having internal passages adapted to coöperate with the ports for causing the pistons to travel, each valve being independent of the other and being mechanically connected to the piston in the opposite cylinder, and air-controlling means actuated by one of said valves.

7. A vacuum operated pulsator for milking machines having two cylinders each provided with a flat external surface forming a valve seat, each valve seat having three ports, one leading to the source of air tension and the other to the opposite ends of the cylinder, flat reversing valves slidable on said seats and having internal passages adapted to connect the ports two at a time and simultaneously uncover one of them, each valve being mechanically connected to the piston in the opposite cylinder, air-controlling means actuated by one of said valves, packing on said pistons and removable plates at at least one end of each cylinder whereby the pistons may be withdrawn for renewing the packing.

8. In a vacuum operated pulsator for milking machines, a source of vacuum, a pair of cylinders having flat, external valve seats each having three ports, one leading to said source and the other two leading to opposite ends of the cylinder, one of the valve seats having a flat extension constituting a third valve seat which also has three ports, one leading to said source of vacuum and the other two for conducting pulsatory air to and from the teat cups, and two independent plates constituting controlling or reversing valves and having internal passages for coöperating with the first and second valve seats, and one of said plates sliding on said third valve seat and having a second internal passage for controlling the ports of said third valve seat and pistons in said cylinders, said plates being mechanically connected to the pistons of the opposite cylinder for being operated by them.

9. In a vacuum operated pulsator for milking machines a pair of cylinders each having pistons and flat surfaces on top each with three ports terminating therein, one of the ports leading from the source of vacuum and the others leading to the two opposite ends of the cylinder, controlling or reversing valves having internal passages for controlling said ports, said valves resting upon said surfaces, whereby gravity and suction tend to hold them closely seated, one of the valve seats having three additional ports, one of which leads to the source of vacuum and the other two are for the pulsatory air, one of the reversing valves having a second internal passage adapted to control said additional ports, the last mentioned reversing valve therefore constituting a combined reversing and pulsator valve, and being held to its seat additionally by the suction of the air in the last three ports mentioned, each of the valves being mechanically connected to the piston in the opposite cylinder.

In witness whereof, I have hereunto subscribed my name.

IRA G. FOSLER.